(12) United States Patent
Kawahara et al.

(10) Patent No.: US 6,327,057 B1
(45) Date of Patent: Dec. 4, 2001

(54) CONTACT TYPE LINEAR IMAGE SENSOR

(75) Inventors: Yukito Kawahara; Satoshi Machida; Masahiro Yokomichi, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/082,521

(22) Filed: May 21, 1998

(30) Foreign Application Priority Data

May 23, 1997 (JP) .................................................. 9-134177

(51) Int. Cl.[7] .................................................. H04N 1/04
(52) U.S. Cl. .............................................. 358/482; 358/474
(58) Field of Search ..................................... 358/482, 483, 358/474; 250/208.1; 348/312, 311, 294

(56) References Cited

U.S. PATENT DOCUMENTS 5,650,864 * 7/1997 Tseng et al. ........................... 358/482
5,777,671 * 7/1998 Maki et al. ........................... 358/483

* cited by examiner

*Primary Examiner*—Cheukfan Lee
(74) *Attorney, Agent, or Firm*—Adams & Wilks

(57) ABSTRACT

To reduce current consumption in a contact type linear image sensor of a multi-chip form, a control circuit controls a clock buffer circuit of the device so that the clock buffer is activated only when a picture signal from a corresponding linear image sensor IC is output. The control circuit inputs a control signal, operates the clock buffer, and drives a shift register when a picture signal is to be read out.

7 Claims, 3 Drawing Sheets

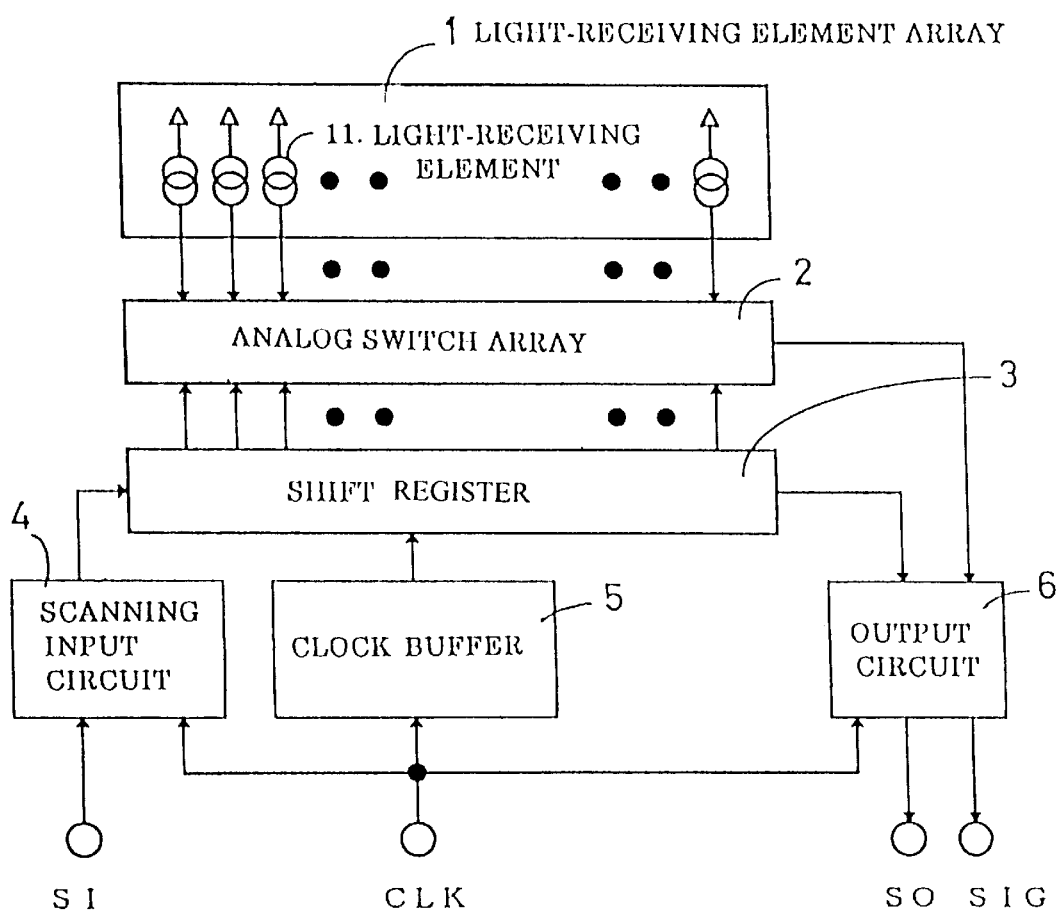

CONTACT TYPE LINEAR IMAGE SENSOR

BACKGROUND OF THE INVENTION

The present invention relates to an image sensor which reads picture-information and electrically transmits it, and which is suitable for a facsimile machine or image scanner.

In the prior art linear image sensor IC, the structure of the linear image sensor IC shown in block diagram form in FIG. 3 is known. This structure comprises a light-receiving element array having a plurality of light-receiving elements, a transfer section for receiving outputs of the light-receiving elements and outputting corresponding electric signals, and comprising an analog switch array having a plurality of switches, a shift register operating as a scanning circuit, and a scanning input circuit and a clock buffer for driving the shift register. An output circuit is further provided for outputting an output signal of the scanning circuit and a picture signal received by the light-receiving element.

However, in a contact type linear image sensor of a multi-chip system having a plurality of prior art linear image sensor ICs, the clock buffer always operates even when the picture signal is in storage and is not being output after reading the picture signal out because a clock signal is always input. Therefore, there has been a problem in that the clock buffer operates idly, which consumes 50% or 90% of the total current of the linear imaging process.

SUMMARY OF THE INVENTION

To solve the above problem, the present invention utilizes a control circuit for controlling a clock buffer so as to drive a shift register by inputting a control signal at least when a picture signal from the corresponding image sensor IC is output and by operating the clock buffer. Therefore, current consumption of the image sensor is suppressed. Moreover, as extra input terminals are reduced by receiving signals from a scanning input circuit and an output circuit at the control circuit and by generating a control signal from the control circuit, current consumption is suppressed.

BRIEF DESCRIPTION OF THE DRAWINGS

FIG. 3 is a block diagram of a prior art linear image sensor IC.

DETAILED DESCRIPTION OF THE INVENTION

Figure 1A:
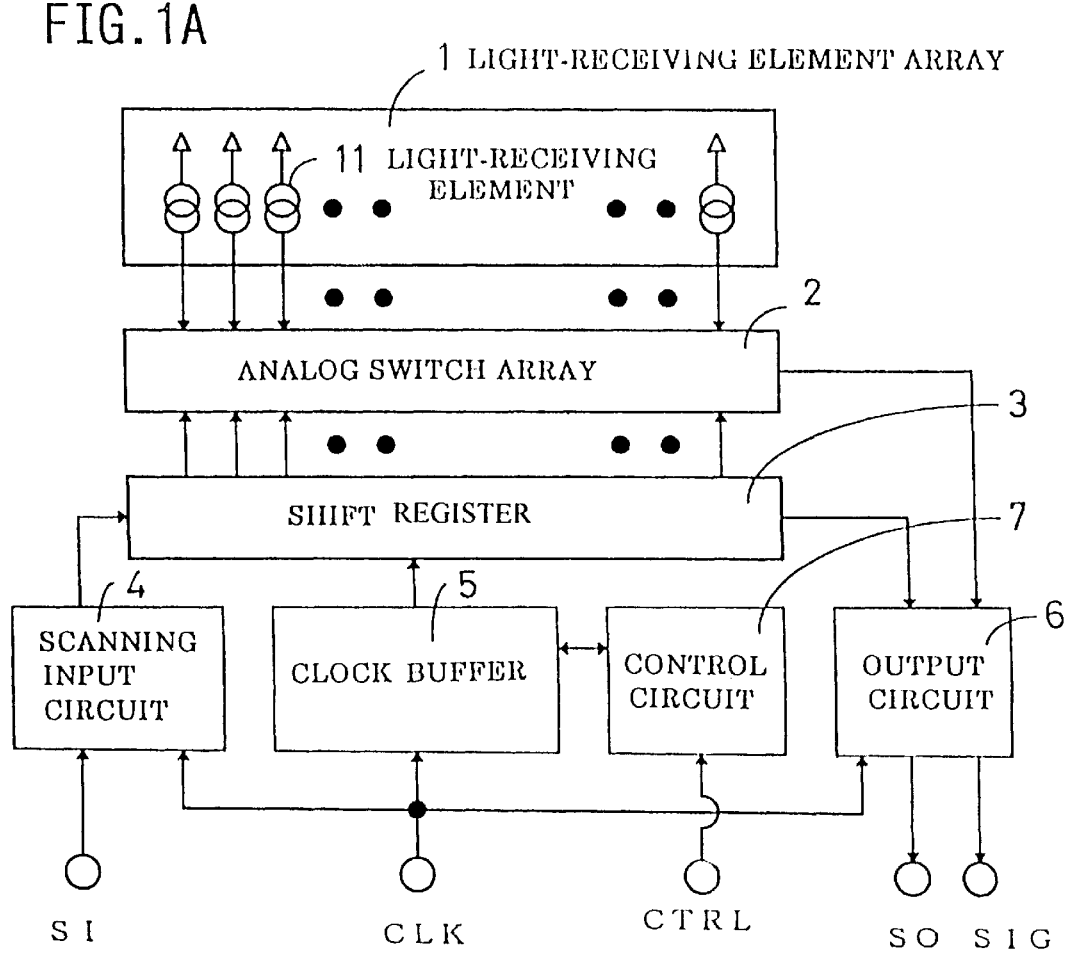
FIG. 1A is a block diagram of a linear image sensor IC in a first preferred embodiment of the present invention.

Referring to the attached figures, embodiments of the present invention will be described in detail. FIG. 1A is a block diagram of a contact type linear image sensor IC showing a first embodiment of the present invention. The linear image sensor IC comprises a light-receiving element array 1 having a plurality of light-receiving elements 11 for reading picture-information arranged in a straight line, a transfer section for receiving outputs of the light-receiving elements and outputting corresponding electric signals, and comprising an analog switch array 2 having a plurality of analog switches connected to each light-receiving element for reading out a signal received by the light-receiving elements 11, a shift register 3 operating as a scanning circuit for scanning a plurality of control terminals of the switches, a scanning input circuit 4 receptive of a start pulse input from an SI terminal for scanning and driving the shift register, and a clock buffer 5 for receiving a clock pulse input from a CLK terminal and for scanning and driving the shift register 3. An output circuit 6 is provided for receiving a scanning start pulse signal from the shift register 3, outputting it through an SO terminal, and reading out the signal received by the light-receiving element array 1 through the analog switch array 2 and a SIG terminal, and a control circuit 7 receives a control signal for controlling operation of the clock buffer input from a CTRL terminal and controls operation of the clock buffer 6 based on the control signal.

Figure 1B:
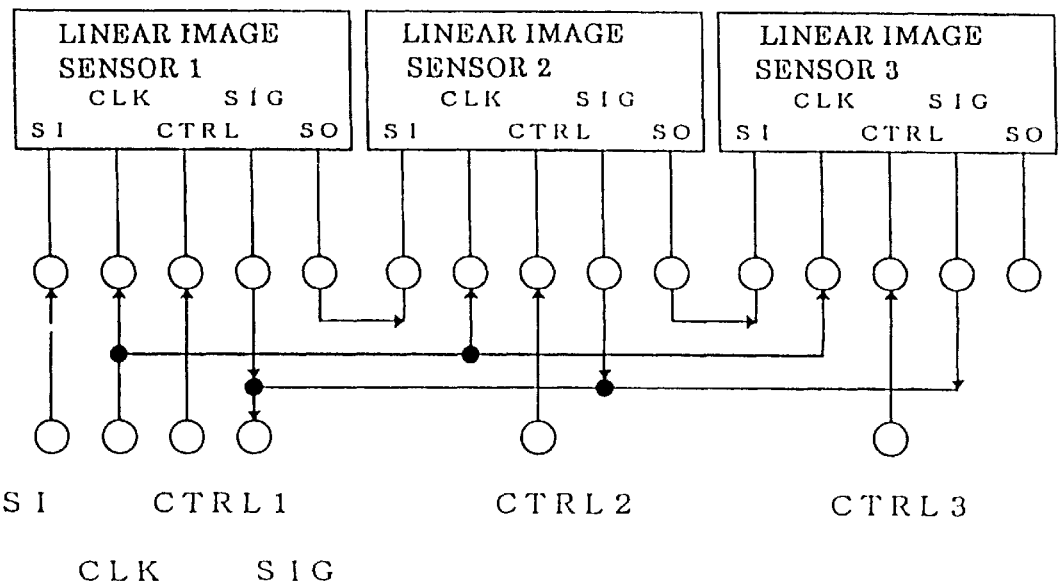
FIG. 1B is a block diagram of a contact type linear image sensor of multi-chip design in the first embodiment of the linear image sensor IC of the present invention.

FIG. 1B shows an embodiment of a contact type linear image sensor of multi-chip form arranging a plurality of the linear image sensor shown in FIG. 1A, having the same reading length as the original, and showing how to connect each terminal of each IC. Only when a picture signal is read out from the corresponding linear image sensor IC, is the desired signal input to the CTRL terminal so as to operate a clock buffer 5 and drive a shift register 3. When the original having a reading width of three chips is read out, each IC does not operate to conduct scanning because the IC stops the clock buffer 5 when the picture signal is not being read out. Therefore, current consumption is suppressed to nearly one-third as compared with ordinary operation. Although the linear sensor of the contact type image sensor shown is comprised of three chips for the sake of convenience, current consumption is suppressed to one-thirtieth when the sensor comprises about thirty chips.

Figure 2A:
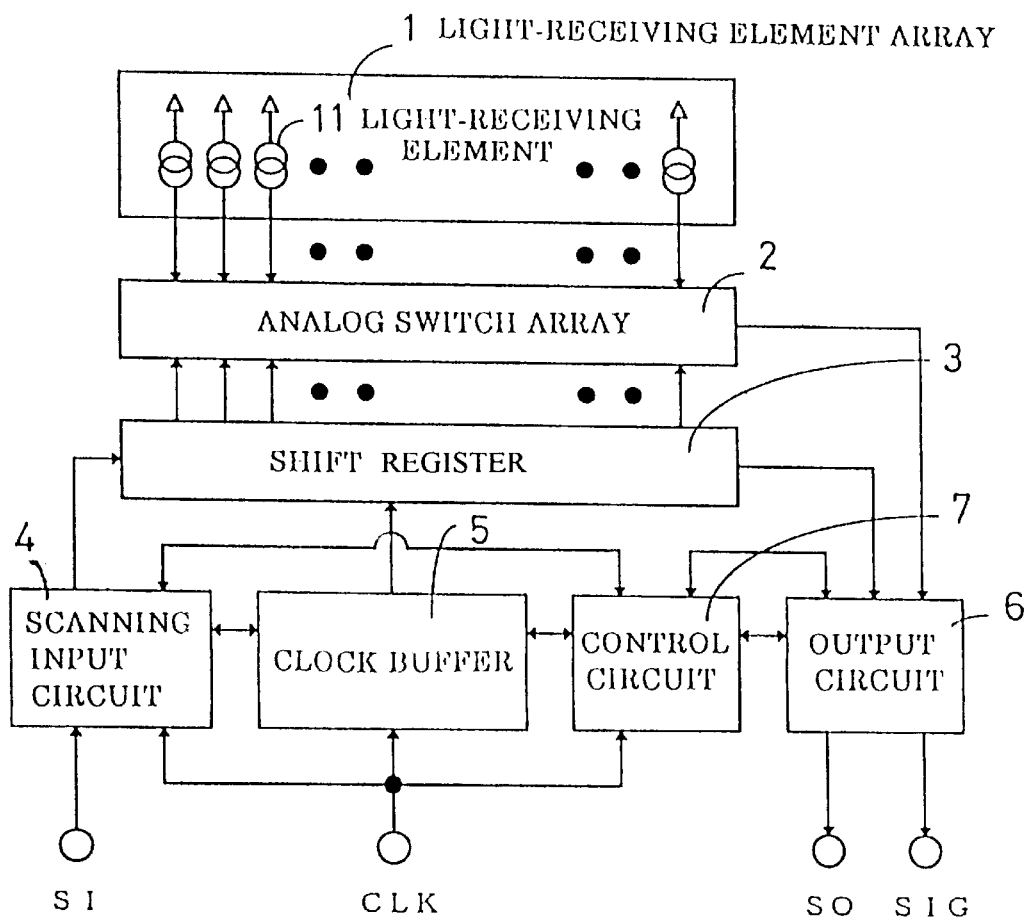
FIG. 2A is a block diagram of a linear image sensor IC in a second preferred embodiment of the present invention.
Figure 2B:
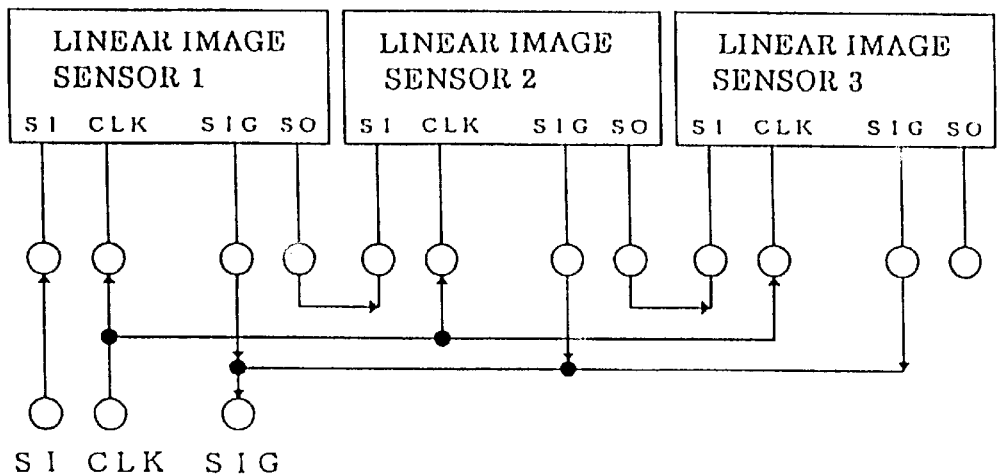
FIG. 2B is a block diagram of a contact type linear image sensor of multi-chip design using the linear image sensor IC of the second preferred embodiment of present invention.

FIGS. 2A and 2B show another embodiment of the present invention. In particular, FIG. 2A is a block diagram of a linear image sensor IC showing another embodiment of the present invention.

The linear image sensor IC comprises a light-receiving element array 1 having a plurality of light-receiving elements 11 for reading picture-information arranged in a straight line, an analog switch array 2 comprising a plurality of analog switches connected to each light-receiving element for reading out a signal received by the light-receiving elements 11, a shift register 3 operating as a scanning circuit for scanning a plurality of control terminals of the switches, a scanning input circuit 4 for receiving a start pulse input from an SI terminal and for scanning and driving the shift register, a clock buffer 5 for receiving a clock pulse input from a CLK terminal and for scanning and driving the shift register 3, an output circuit 6 for receiving a scanning start pulse signal from the shift register 3, outputting it out through an SO terminal, and reading out the signal received by the light-receiving element array 1 through the analog switch array 2 and a SIG terminal, and a control circuit 7 for receiving a signal from the scanning input circuit 4 and the output circuit 6 and for generating a signal controlling operation of the clock buffer 6.

FIG. 2B shows an embodiment of a contact type linear image sensor of multi-chip form comprising a plurality of the linear image sensors shown in FIG. 2A and having the same reading length as the original, and shows how to connect each terminal of each IC. Only when a picture signal is read out from the corresponding linear image sensor IC, the clock buffer 5 operated by a clock buffer control signal generated by the control circuit in the corresponding image sensor IC so as to drive a shift register 3. When the original has a reading width of three chips is read out, each IC does not operate to conduct scanning because the IC stops the clock buffer 5 when the picture signal is not being read out. Therefore, current consumption is suppressed to nearly one-third as compared to ordinary operation. Although the linear sensor of the contact type image sensor shown is comprised of three chips for the sake of convenience, current consumption is suppressed to one-thirtieth when the sensor comprises about thirty chips. Moreover, when comparing FIGS. 1A and 1B, the CTRL terminal is omitted in FIG. 2B.

As described above, using the present invention, current consumption of the linear image sensor can be sharply suppressed. Moreover, by using the present invention, current consumption can be suppressed without forming extra input terminals. The higher the clock frequency of the scanning circuit, the more effective the present invention is, and the present invention is suitable for a picture input device driven by a battery or a picture input device having an external power supply.

What is claimed is:

1. A contact type linear image sensor comprising:

a light-receiving element array having a plurality of light-receiving elements for reading out picture information, the light-receiving elements being arranged in straight line on a semiconductor substrate;

an analog switch array comprising a plurality of analog switches each connected to a respective light-receiving element for reading out a signal received by the light-receiving elements;

a shift register operating as a scanning circuit for scanning a plurality of control terminals of the analog switches;

a scanning input circuit for receiving a start pulse for scanning and driving the shift register;

a clock buffer for receiving a clock pulse for scanning and driving the shift register;

an output circuit for receiving a scanning start pulse signal from the shift register, outputting the scanning start signal through the analog switch array, and reading out the signal received by the light-receiving element array through the analog switch array; and a control circuit for receiving a control signal for controlling operation of the clock buffer and for activating the clock buffer substantially only when picture information is to be read out.

2. A contact type linear image sensor according to claim 1; wherein the control circuit activates the clock buffer only when picture information is to be read out from one of the light-receiving element array and the analog switch array.

3. A contact type linear image sensor comprising:

a light-receiving element array having a plurality of light-receiving elements for reading out picture information, the light-receiving elements being arranged in a straight line on a semiconductor substrate;

an analog switch array comprising a plurality of analog switches each connected to a respective light-receiving element for reading out a signal received by the light-receiving elements;

a shift register operating as a scanning circuit for scanning a plurality of control terminals of the analog switches;

a scanning input circuit for receiving a start pulse for scanning and driving the shift register;

a clock buffer for receiving a clock pulse for scanning and driving the shift register;

an output circuit for receiving a scanning start pulse signal from the shift register, outputting the scanning start signal through the analog switch array, and reading out the signal received by the light-receiving element array through the analog switch array; and a control circuit for receiving a signal from the scanning input circuit and the output circuit and for producing signal in accordance therewith for activating the clock buffer substantially only when picture information is to be read out.

4. A contact type linear image sensor according to claim 3; wherein the control circuit activates the clock buffer only when picture information is to be read out from one of the light-receiving element array and the analog switch array.

5. A linear image sensor comprising: a linear array of light-receiving elements for reading out image information; a transfer section having a clock buffer circuit for receiving outputs of the light-receiving elements and outputting corresponding electric signals; and a control circuit for controlling the transfer section; wherein the control circuit activates the clock buffer substantially only when image information is to be read out from one of the light-receiving elements and the transfer section.

6. A linear image sensor according to claim 5; wherein the transfer section comprises an analog switch array comprising a plurality of analog switches each connected to a respective light-receiving element for reading out a signal received by the light-receiving elements, a shift register for scanning a plurality of control terminals of the analog switches, a scanning input circuit for receiving a start pulse for driving the shift register, a clock buffer for receiving a clock pulse for driving the shift register, and an output circuit for receiving a scanning start pulse signal from the shift register, outputting the scanning start signal through the analog switch array, and reading out the signal received by the light-receiving element array through the analog switch array.

7. A linear image sensor according to claim 6; wherein the control circuit activates the clock buffer only when image information is to be read out from one of the light-receiving elements and the transfer section.

* * * * *